Figure 1:
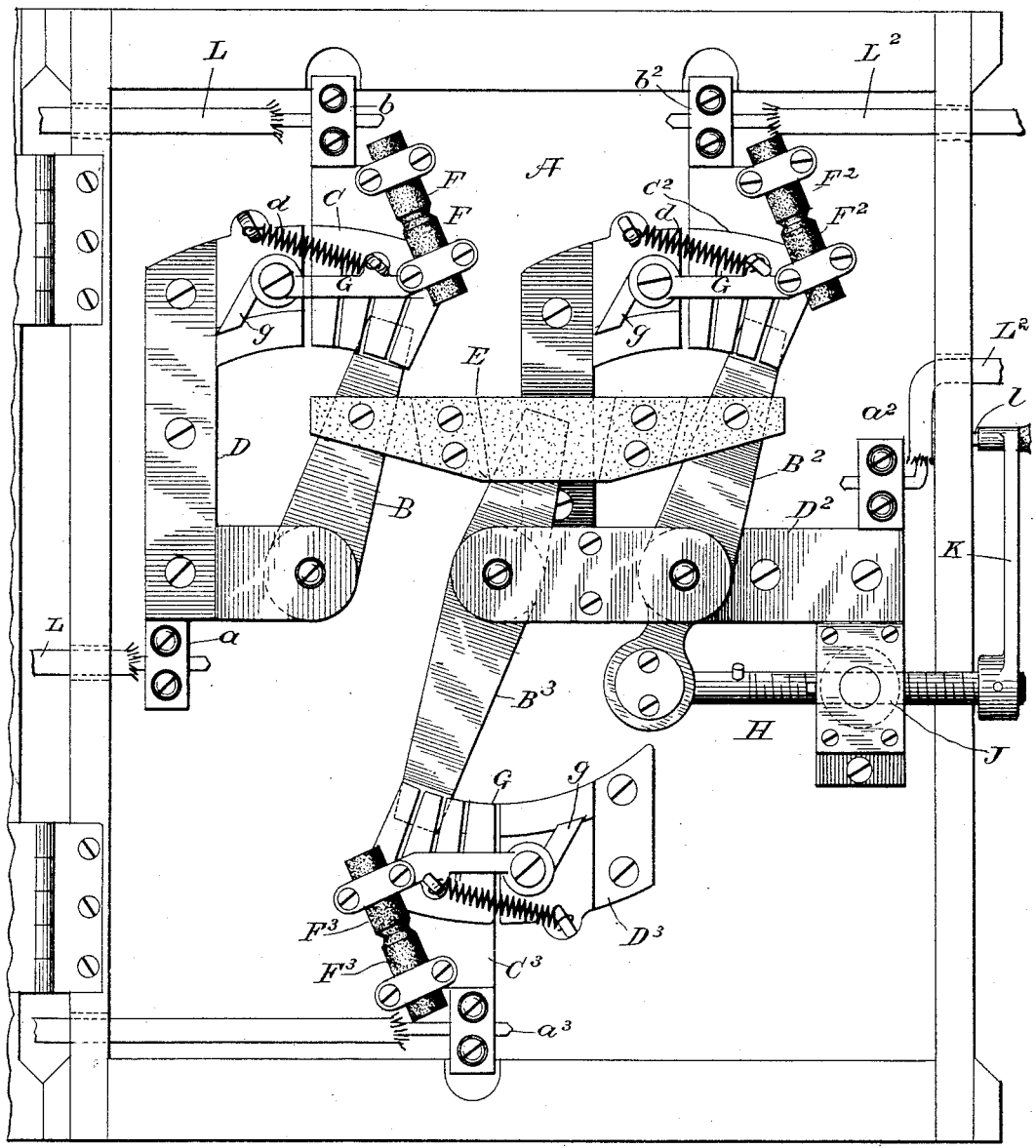

(No Model.) 5 Sheets—Sheet 1.
W. HOCHHAUSEN.
ELECTRIC STARTING SWITCH.

No. 447,827. Patented Mar. 10, 1891.

ATTEST:  
INVENTOR:  
Wm Hochhausen  
By H. L. Townsend  
Attorney

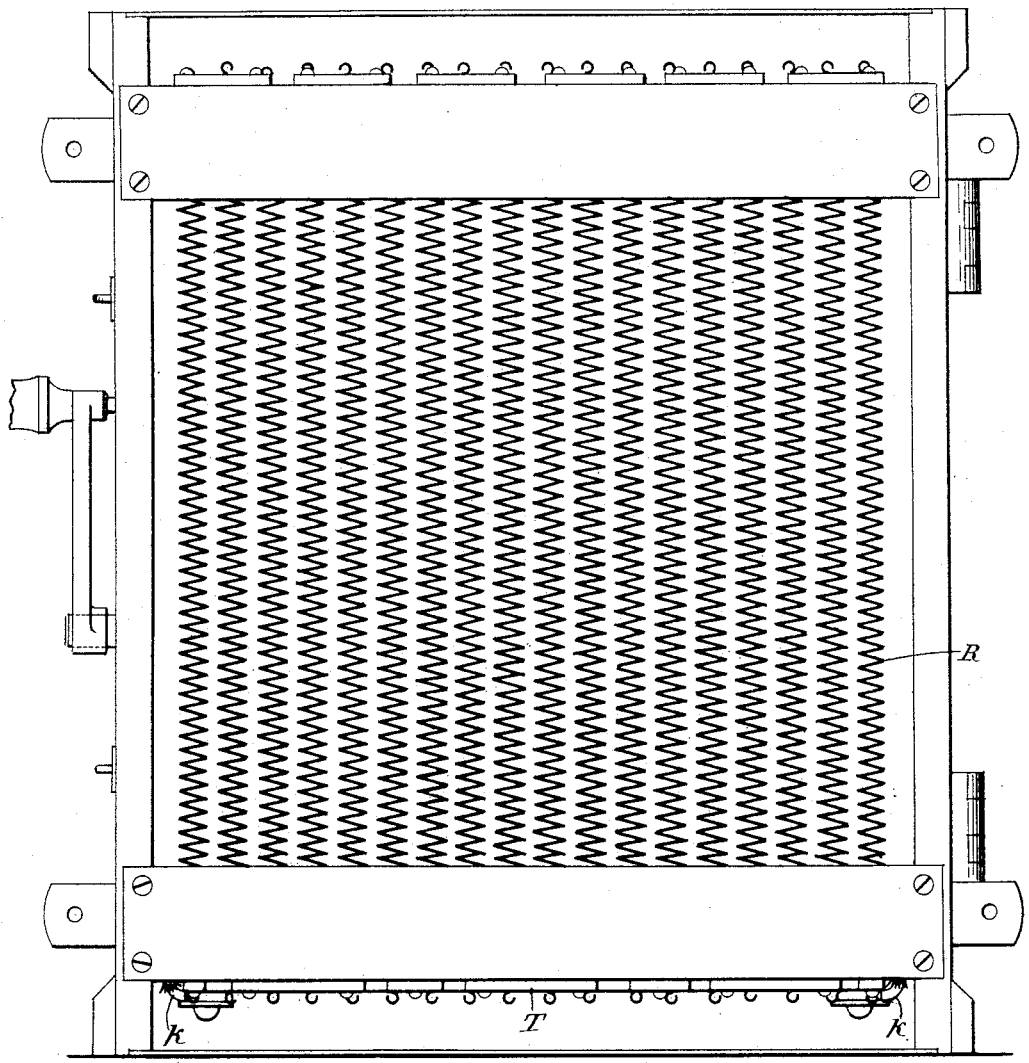

(No Model.) 5 Sheets—Sheet 3.
W. HOCHHAUSEN.
ELECTRIC STARTING SWITCH.
No. 447,827. Patented Mar. 10, 1891.
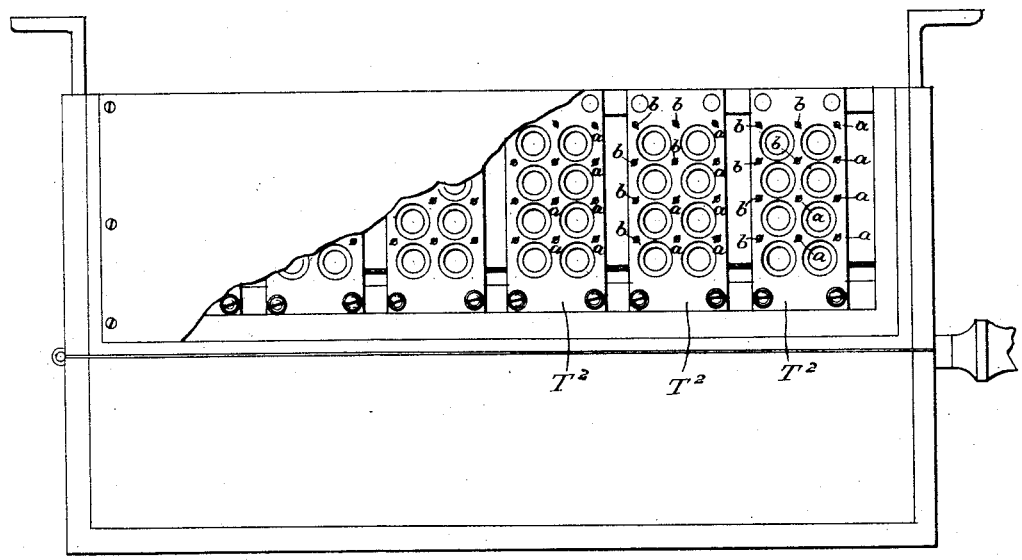
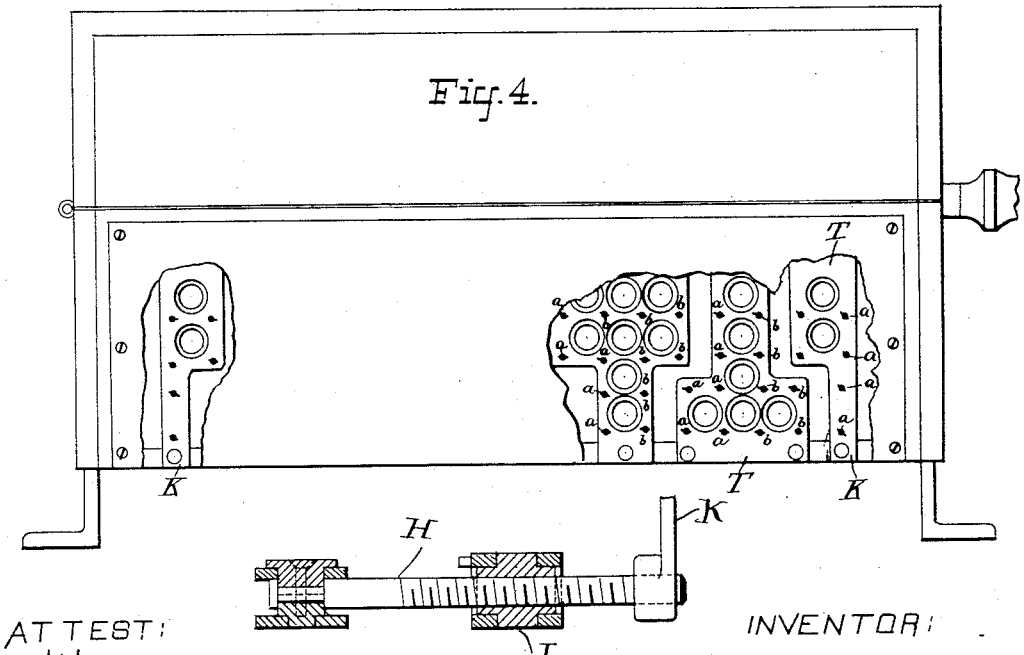
ATTEST:
INVENTOR:
Wm Hochhausen
By H. C. Townsend
Attorney (No Model.)

W. HOCHHAUSEN.
ELECTRIC STARTING SWITCH.

No. 447,827. Patented Mar. 10, 1891.

5 Sheets—Sheet 4.

ATTEST:

INVENTOR:
Wm Hochhausen
By H. C. Townsend
Attorney

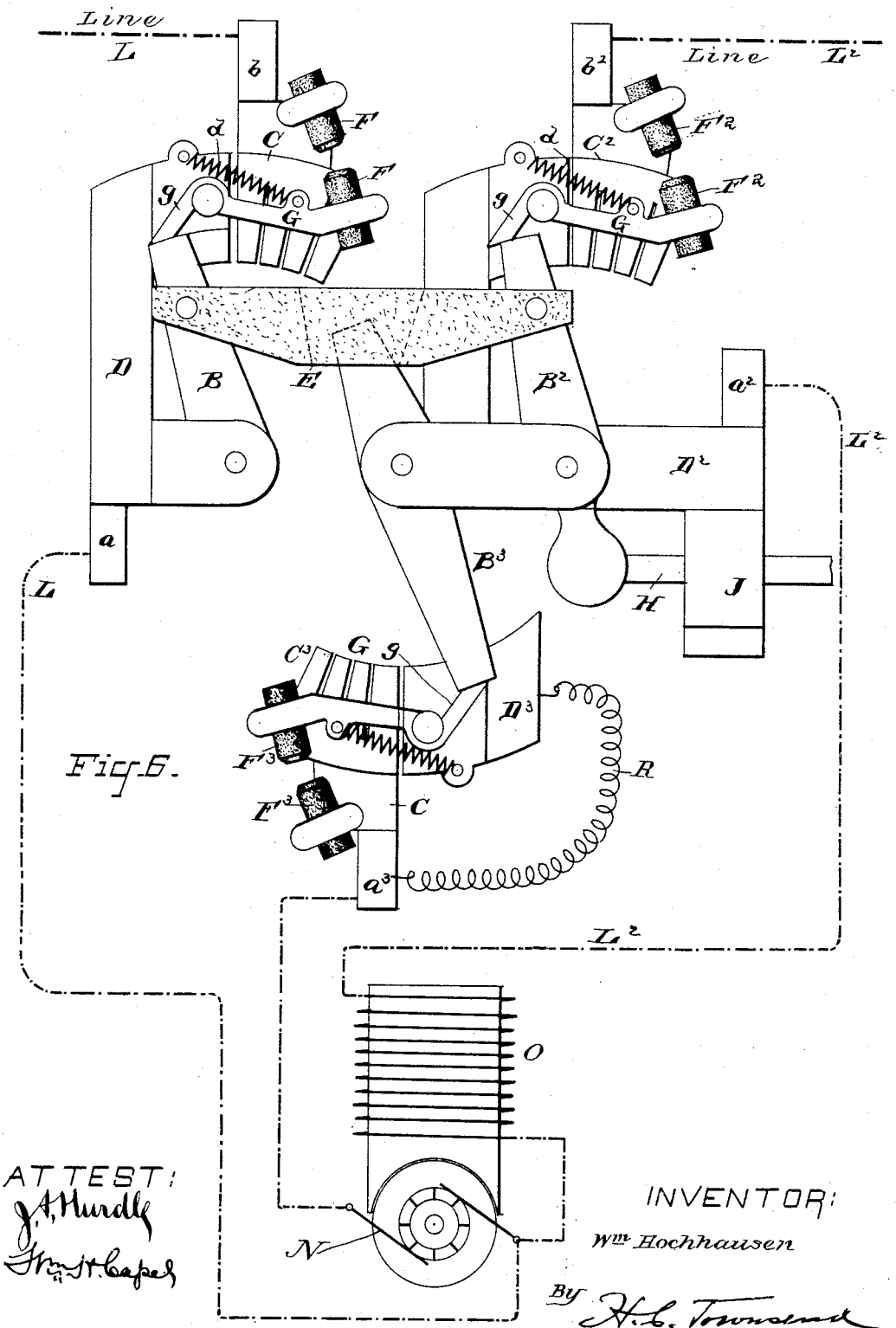

UNITED STATES PATENT OFFICE.

WILLIAM HOCHHAUSEN, OF BROOKLYN, NEW YORK.

ELECTRIC STARTING-SWITCH.

SPECIFICATION forming part of Letters Patent No. 447,827, dated March 10, 1891.

Application filed November 26, 1889. Serial No. 331,659. (No model.)

*To all whom it may concern:*

Be it known that I, WILLIAM HOCHHAUSEN, a citizen of the United States, and a resident of Brooklyn, in the county of Kings and State of New York, have invented a certain new and useful Electric Starting-Switch, of which the following is a specification.

My invention relates particularly to electric switches used with electric motors for starting or stopping the same.

My invention consists in the combination, with an electric motor and its main starting-switch, of a secondary switch controlling a resistance or other device for preventing damage to the motor-armature at starting, and an actuating device for said secondary switch operated positively by the main switch or a part moving with the same, but having a lost motion, so that the resistance or safety device may not be cut out until after some interval has elapsed after the closing of circuit to the motor, and the latter may therefore have an opportunity to acquire speed and counter electro-motive force, which will save it from damage and permit the current to be turned full on by the removal of the resistance or by other operation controlled by said secondary switch.

My invention consists, further, in the interposition of some kind of speed-reducing gear or mechanism between the actuating devices of the apparatus and the switch whereby a considerable movement of the actuating-handle requiring time may be required before the necessary changes shall be produced in the switch, whereby the motor may have time to acquire speed and counter electro-motive force. The gear thus interposed may be of any desired character. I have shown herein a screw-shaft working in a fixed nut, the end motion of the shaft being communicated to the switch; but it is obvious that the shaft might turn in ordinary bearings and end motion of the nut be used. It is also obvious that any other mechanical gear of a speed-reducing character might be used. An additional advantage in such construction is that the power in the switch itself is augmented and there is no opportunity for its sticking.

My invention consists, further, in special combinations and details of construction more particularly hereinafter described, and then specified in the claims.

Figure 5:
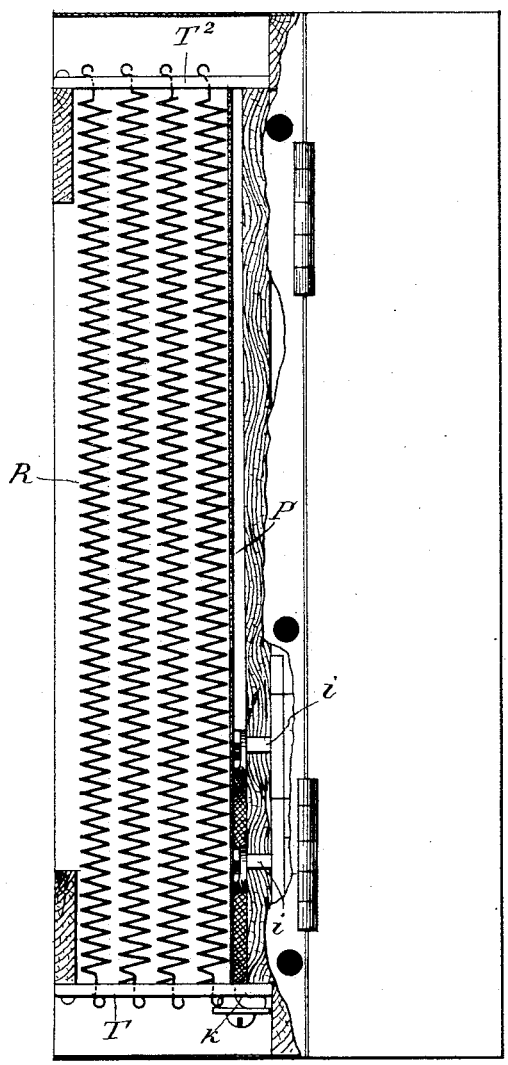

Figure 1 is a general side elevation of an apparatus embodying my invention. Fig. 2 is a rear elevation showing the resistance-frame. Fig. 3 is a top plan view. Fig. 4 is a bottom plan, inverted. Fig. 5 is a vertical section through the resistance-frame. Fig. 6 is a diagram of the circuits of the apparatus when connected to an electric motor. Fig. 7 shows a detail of construction.

While I have shown my invention as carried out in connection with a double-pole switch, its application to a single-pole switch will be obvious.

A is a base of slate or other insulating material on which the parts are mounted, and which may be included in a box of iron, and B $B^2$ are the two movable switch-levers or contacts of a double-pole switch.

C $C^2$ are contact blocks or points with which the levers may engage or disengage for the purpose of closing circuit or breaking circuit, while D $D^2$ are plates or supports of metal upon which B $B^2$ are pivoted. At $a$ $a^2$ these plates are shown provided with suitable means for attachment or connection of main wires or conductors L $L^2$ with the switch contacts or blocks C $C^2$. These wires are in the present instance supposed to be of constant potential or potential which is maintained automatically irrespective of the condition of the circuit between them.

E is an insulating connecting-bar by which the levers B $B^2$ are caused to move together.

Supplemental wear-switches or circuit breakers and closers for operation in accordance with my invention are indicated at F F $F^2$ $F^2$. They are preferably of carbon, and the two of each pair are in connection, respectively, with the line or part of circuit with which C or $C^2$ is in connection and with the part of circuit with which B or $B^2$ is in connection. For convenience I mount them on and in electrical connection with the plates C D and $C^2$ $D^2$. They are attached or held in place on their supports by straps or clamps, as shown, or by other means permitting renewal of the contacts themselves. One of each pair is made movable by mounting on a lever or other suitable support G or $G^2$. To move these levers, I cause them to be engaged by the levers B B² or other device acting with said levers, for which purpose the levers G G² may have arms or shoulders $g\ g$ in the path of levers B B², as shown. Springs $d$ tend to hold the contacts F F and F² F² together. The parts are so arranged that when the switches or circuit closers and breakers B B² are moved from the position shown they will not engage with the levers G until after contact of B or B² with C C² is broken, so that final rupture of electric connection from L or L² to the local wire joined to D or D² will take place between the supplemental switch-contacts, and any spark produced will appear only at such contacts. On reverse movement the circuit will obviously be closed at F or F² before B or B² makes contact on its opposite electrode C or C², and B and B² are therefore safe from damage by sparking, the spark or arc, if any, on this movement of B B² having been produced on the supplemental contacts. It is not essential by what means the supplemental contacts are operated, and they might obviously have a positive movement in both directions instead of by a spring action in one direction.

An auxiliary or safety switch at B³ consists of a lever pivoted on block or plate D² so as to be in connection with B² and adapted to move from one to the other of two contact blocks or plates C³ D³ in obvious manner. In connection with this switch supplemental wear-contacts F³ F³, like those already described, may be employed. At $a^3$ is shown a means for attachment of a local wire, as shown, leading, as indicated in Fig. 6, to the armature N of an electric motor. C³ D³ are also connected with the safety device or circuit which is designed to save the motor from injury on starting, and which may be the usual device of an artificial resistance R, mounted and connected at its terminals to C³ and D³ in a manner to be presently described more fully. In the position of the parts shown in Fig. 1 the resistance is out of the armature-circuit, while in the opposite position (shown in Fig. 6) the resistance is in circuit with the armature. The opposite side or terminal of the armature connects to D, as shown, and the field-magnet O, in derivation or branch to the armature, connects to D² at $a^2$. The circuits thus formed from L to L² through the armature and field of high resistance are those usually employed for shunt-wound motors between constant-potential mains.

The switch B³ is operated by the main switch or mechanism actuating the latter by some device or connection having lost motion, so that when the lever B³ is in connection with D³, thereby putting the safety-resistance in the circuit with the armature, a considerable movement of the main switch after closure of circuit by it shall ensue before B³ shall be thrown to the position on C³ where the resistance will be thrown out. Hence after closing circuit to the motor an interval elapses before cutting out R, during which the armature may acquire speed, so that it will not be damaged by current when R is cut out. This lost movement is attained simply by engaging lever B³ by a shoulder or offset on cross-bar E. Preferably B³ works in a slot in E and has a considerable play therein. Its movement in both directions is therefore by positive action, and the lost motion exists on the operation described and also on the reverse movement to cut out the motor, although it is not necessary in the latter movement.

By operating the main switch through a speed-reducing gear, as before explained, the time interval between closing the main switch and the removal of the safety device or resistance by B³ is increased and safety insured. As an example of such a speed-reducing mechanism I have shown a device working on the principle of the screw or worm.

H is a screw-shaft to which operating-handle K is attached, and J is a nut mounted in a rocking bearing, so that it may accommodate itself to a movement of the inner end of the shaft transversely on the arc of a circle, where it works in a rocking bearing attached to the main switch B². On turning the handle a slow end movement of the shaft is produced and is communicated to the switching mechanism. A stop-pin $l$ may be used to stop the handle when the shaft has moved inward to the desired extent, and a second stop $l^2$ on the shaft may limit the outward movement. This or any other speed-reducing mechanism employed for the purpose stated has the additional advantage of compelling a movement of the switch against ordinary tendencies to stick or bind in its contacts.

Connection of a resistance with the plates or blocks C³ D³ is made on the back of the board A by means of studs $i\ i$, projecting through the branch from said blocks and provided with suitable binding or attaching devices, such as clamp-nuts, for wires $k\ k$, leading to the resistance.

The resistance R consists of lengths of wire spiral attached at their ends to conducting-plates T T², which are attached to a frame and cross-bars of the back of board A, as shown. The plates are perforated to allow ventilation, and the bottom plates T are of the form shown in Fig. 4, inverted, while the top plates T² lie partly over the lower. The wires $k\ k$ are attached, respectively, to the terminal plates T² T², and the wire spirals are in circuit up and down in groups of six from a bottom plate T to a top plate T² and from the latter through another group of six attached to the same plate T, to which the next group of six is attached. The terminals of the spirals of these groups in which the circuit passes upwardly, as from a plate T to T², are designated by the numeral 1, and the terminals of the spirals in which the circuit continues downwardly from T² to the next plate T are designated by the numeral 2.

A sheet of asbestus P may be interposed between the wire spirals and the back of board A, to protect the latter from contact when the wires are highly heated by the current.

While I have described the lengths of spiral wire as coupled in groups of six, it is obvious that they might be arranged in groups of four, two, three, or any other number greater or less than six, and according to the volume of current which is required to pass through them.

What I claim as my invention is—

1. The combination, with the main switch and its actuating devices, of a resistance-switch positively operated by said actuating devices in a direction to throw out the resistance and having a lost motion adjusted as described, so that an interval shall elapse after the closure of the main switch before the resistance-switch may be moved by the actuating devices to position where the resistance will be thrown out.

2. The combination, with an electric motor and the main starting and stopping switch for making and breaking connection between the motor and the electric source, of a secondary safety-switch controlling the armature-circuit, an actuating-handle for throwing both said switches positively in the operation of starting the motor, and intermediate actuating mechanism between the safety-switch and actuating-handle having lost motion, as described, whereby a time interval may elapse between the closure of the main switch and the movement of the safety-switch under the operation of the actuating-handle to position where the safety device shall be thrown out of action.

3. The combination, with an electric motor, of a starting and stopping switch, an actuating-handle therefor, a safety device for preventing injury to the armature from excessive flow of current through it, and a switch for throwing said safety device into and out of circuit and connected with and positively operated by said actuating-handle through devices having a lost motion when the apparatus is operated in a direction to start the motor, as and for the purpose described.

4. The combination, with a starting-switch and a shouldered bar, as E, connected therewith, of a safety-switch engaged by the shoulder on the shouldered bar and adapted to be actuated thereby after the main switch has been actuated, substantially as and for the purpose described.

5. The combination, with a starting-switch and a safety-switch, of a slotted bar connected to the starting-switch, the lever of the safety-switch extending into the slot of the slotted bar and having considerable play therein, substantially as and for the purpose described.

6. The combination, as and for the purpose described, of a circuit closing and breaking switch, a safety-switch, an actuating-handle connected with the main switch through a speed-reducing mechanism, and devices for moving the safety-switch when the actuating mechanism has moved to a predetermined extent.

7. The combination, as and for the purpose described, of a circuit closing and breaking switch, a safety-switch, an actuating-handle connected with the main switch through a speed-retarding mechanism, and devices having lost motion for moving the safety-switch when the actuating mechanism has moved to a predetermined extent.

8. The combination, as and for the purpose described, of a circuit closing and breaking switch, a safety-switch, an actuating-handle, an independent worm or screw shaft connecting the same with the main switch, and devices having lost motion for moving the safety-switch when the actuating mechanism has moved to a predetermined extent.

Signed at New York, in the county of New York and State of New York, this 18th day of November, A. D. 1889.

WILLIAM HOCHHAUSEN.

Witnesses:
 WM. H. CAPEL,
 THOS. F. CONREY.